United States Patent
Lin et al.

(10) Patent No.: US 11,119,329 B2
(45) Date of Patent: Sep. 14, 2021

(54) HEAD-MOUNTED DISPLAY

(71) Applicant: HTC Corporation, Taoyuan (TW)

(72) Inventors: Sheng-Cherng Lin, Taoyuan (TW); Jui-Hsiang Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/416,287

(22) Filed: May 20, 2019

(65) Prior Publication Data

US 2020/0371363 A1    Nov. 26, 2020

(51) Int. Cl.
*G02B 27/01*    (2006.01)
*A42B 3/04*    (2006.01)
*A42B 1/22*    (2006.01)

(52) U.S. Cl.
CPC ............ *G02B 27/0176* (2013.01); *A42B 1/22* (2013.01); *A42B 3/04* (2013.01); *G02B 2027/0154* (2013.01); *G02B 2027/0161* (2013.01); *G02B 2027/0178* (2013.01)

(58) Field of Classification Search
CPC ........ G02B 27/0176; G02B 2027/0154; G02B 27/0161; A42B 1/22; A42B 3/085; A42B 3/142; A42B 3/145; A42B 3/04; F16H 2019/046
USPC ........................................................ 224/181
See application file for complete search history.

(56) References Cited

U.S. PATENT DOCUMENTS

| | | | | |
|---|---|---|---|---|
| 4,999,846 A * | 3/1991 | Ball | ........................ | A42B 1/22 2/417 |
| 8,819,870 B2 * | 9/2014 | Rogers | ................... | A42B 3/145 2/417 |
| 9,551,405 B1 * | 1/2017 | Chen | ..................... | A44B 11/008 |
| 10,251,292 B2 * | 4/2019 | Araki | ................... | H04N 5/7491 |
| 2002/0118506 A1 | 8/2002 | Saito | | |
| 2009/0320187 A1 | 12/2009 | Petzl et al. | | |
| 2019/0159354 A1 * | 5/2019 | Zheng | ..................... | A42B 1/24 |

FOREIGN PATENT DOCUMENTS

| | | |
|---|---|---|
| CN | 106019602 | 10/2016 |
| TW | 352890 | 2/1999 |
| TW | 201904460 | 2/2019 |

OTHER PUBLICATIONS

Richard Pestes, "Saris T-Bones Bike Rack", Sep. 17, 2009, Available at: https://www.pezcyclingnews.com/technspec/pez-reviews-saris-t-bones-bike-rack-2/.
"Office Action of Taiwan Counterpart Application", dated Jul. 20, 2020, pp. 1-3.

* cited by examiner

*Primary Examiner* — Scott T McNurlen
(74) *Attorney, Agent, or Firm* — JCIPRNET

(57) ABSTRACT

A head-mounted display includes a wearing part, a display body, a strap, a follower, and a buckle assembly. The display body is disposed on the wearing part. The strap includes a first end, a second end, and a handle portion. The wearing part is located at a front side of a wearing space surrounded by the strap. The first end and the second end are overlapped at the front side. The handle portion is located at the first end or the second end. The follower is disposed on the wearing part and coupled to the first end and the second end. The buckle assembly is disposed between the wearing part and the first end, and is adapted to lock a relative position between the wearing part and the first end in a buckled state and remove the interference between the wearing part and the first end in a released state.

14 Claims, 20 Drawing Sheets

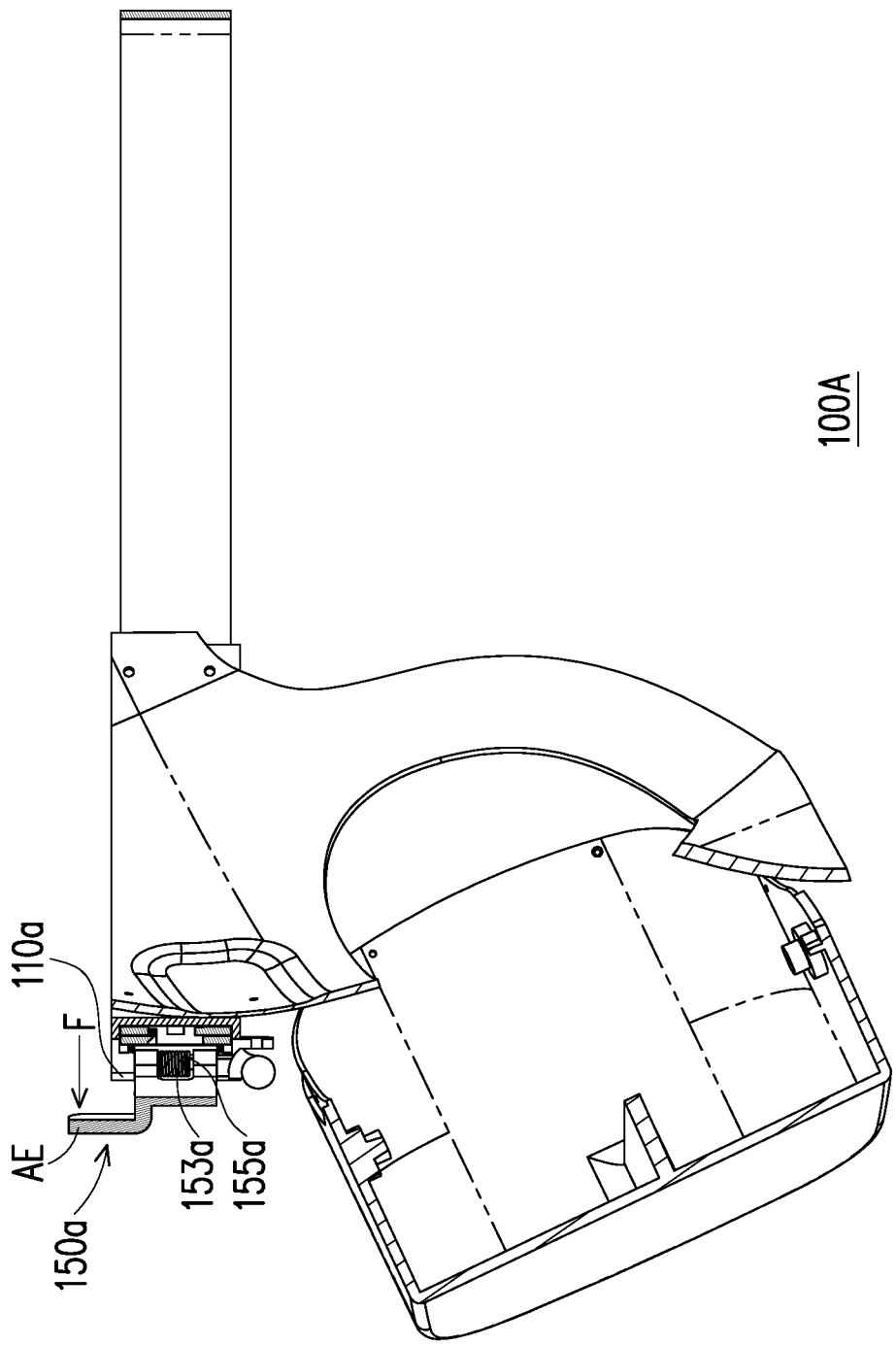

HEAD-MOUNTED DISPLAY

BACKGROUND OF THE INVENTION

Field of the Invention

The application relates to a head-mounted display, and particularly relates to a head-mounted display of which a wearing size is adjustable at the front side.

Description of Related Art

The virtual reality (VR) technique is one of the next-generation display technologies and mainly serves to integrate the computer graphic system and various display and control apparatuses to thereby generate virtual three-dimensional images. The virtual three-dimensional images are mainly realized through VR goggles, and VR goggles are usually combined with a strap to form a head-mounted display for the user to wear.

In order for the strap of the head-mounted display to fit the head sizes of different users, an adjustment mechanism is currently adopted, so that the user may manually exert a force with his/her hand to loosen or tighten the strap. However, currently, the adjustment mechanism is usually disposed near the back of the user's head. When the user lies on the bed or sits on a chair, the adjustment mechanism may be pressed against the bed or the head rest, making it difficult for the user to adjust the wearing size with his/her hands. Therefore, how to make the head-mounted display more easily adjustable to be adaptable to the scenario of lying or sitting now becomes one of the issues to work on.

SUMMARY OF THE INVENTION

The application provides a head-mounted display in which a size of a wearing space is adjustable at a front side of the head-mounted display, so that the user is still able to adjust the wearing space without being interfered when lying on a bed or sitting on a chair.

A head-mounted display of the application includes a wearing part, a display body, a strap, a follower, and a buckle assembly. The display body is disposed on the wearing part. The strap includes a first end, a second end, and a handle portion. The strap is surrounding to form a wearing space. The wearing part is located at a front side of the wearing space, and the first end and the second end are overlapped at the front side. The handle portion is located at the first end or the second end. The follower is disposed on the wearing part and coupled to the first end and the second end, so as to drive the first end and the second end to relatively move away from or toward each other to respectively enlarge or decrease the wearing space. The buckle assembly is disposed between the wearing part and the first end. The buckle assembly is adapted to lock a relative position between the wearing part and the first end in a buckled state, so as to refrain the first end and the second end from relatively moving away from each other. In addition, the buckle assembly is adapted to remove interference between the wearing part and the first end in a released state.

Based on the above, in the head-mounted display of the application, the first end and the second end of the strap are overlapped at the front side, and the handle portion and the follower are adopted to drive the first end and the second end to relatively move away from or toward each other, so as to enlarge or decrease the size of the wearing space, thereby allowing the head-mounted display to be adaptable to different head shapes and sizes. Since the first end, the second end, and the handle portion of the application are all disposed at the front side of the wearing space (corresponding to the user's forehead), when wearing the head-mounted display and lying on the bed or sitting on a chair, the user may still control the handle portion with a single hand to adjust the size of the wearing space without being interfered.

Besides, the buckle assembly of the application is switchable between the buckled state and the released state. In the buckled state, the buckle assembly is configured to lock the relative position between the wearing part and the first end, so that the first end and the second end are unable to relatively move away from each other, thereby limiting the user to only gradually decrease the wearing space. In the released state, there is no interference between the wearing part and the first end. Therefore, the first end and the second end may relatively move away from or toward each other, so that the user may freely adjust the size of the wearing space, thereby making the adjustment more efficient.

In order to make the aforementioned and other features and advantages of the invention comprehensible, several exemplary embodiments accompanied with figures are described in detail below.

BRIEF DESCRIPTION OF THE DRAWINGS

FIG. 3D is a schematic view of a released state of the buckle assembly of the head-mounted display of FIG. 3A.

DESCRIPTION OF THE EMBODIMENTS

Figure 1A:
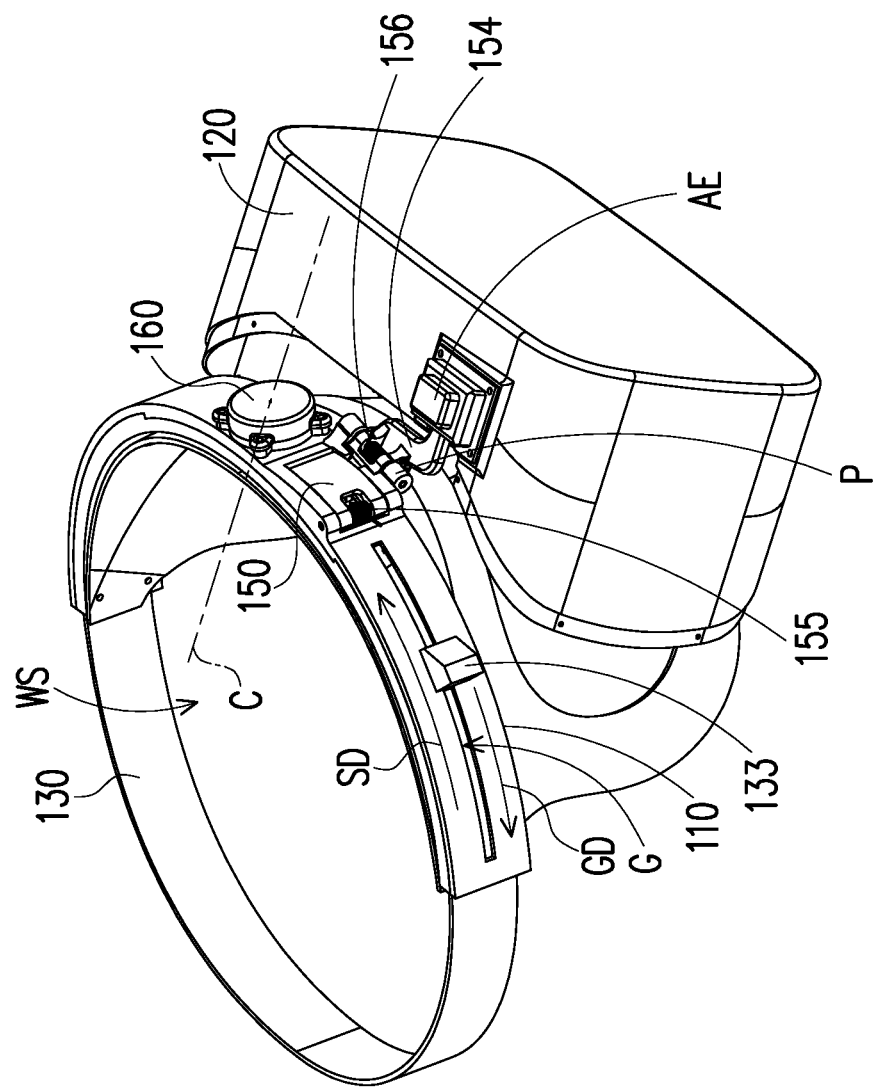
FIG. 1A is a schematic perspective view of a head-mounted display according to an embodiment of the invention.
Figure 1B:
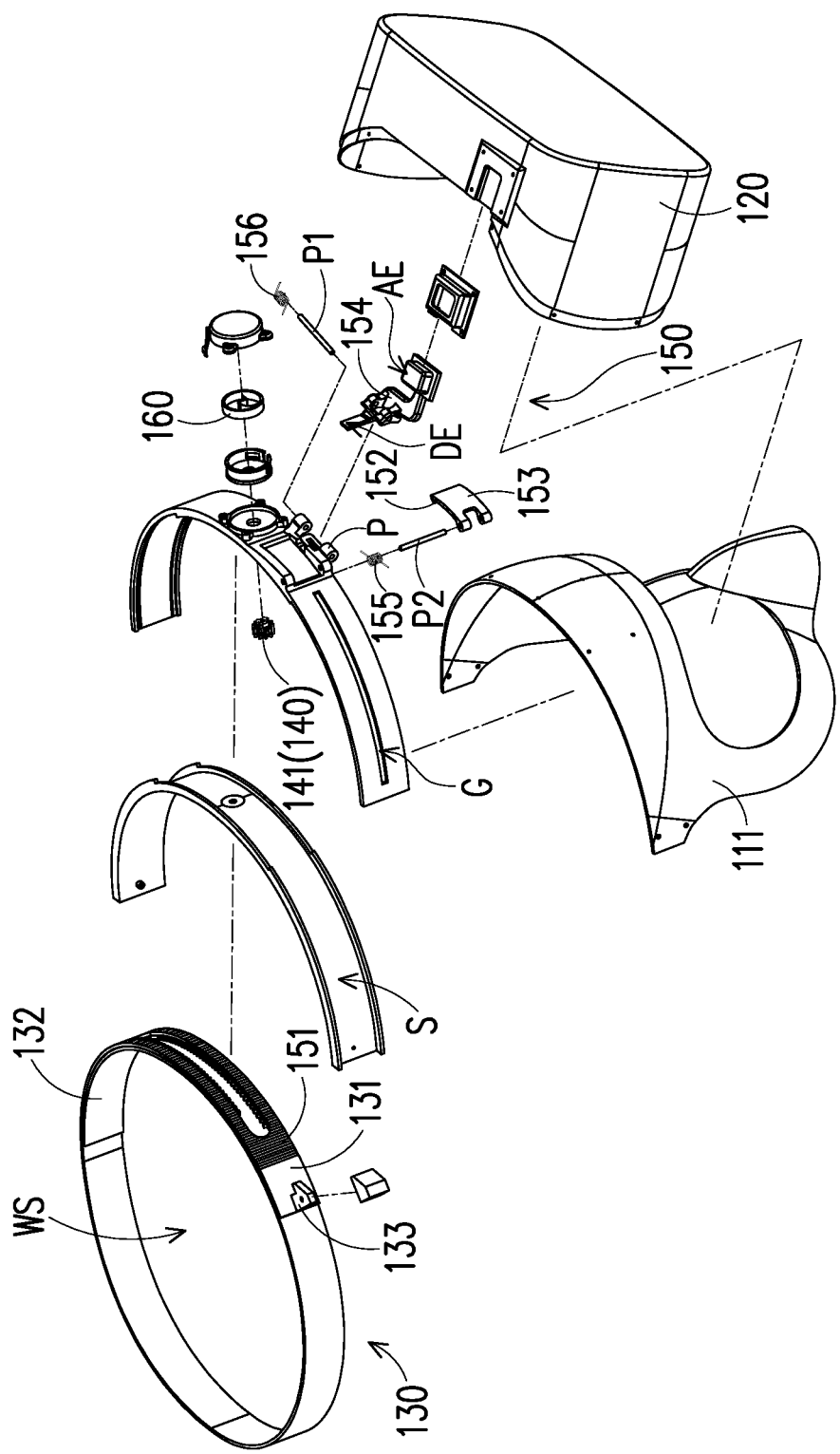
FIG. 1B is a schematic exploded view of components of the head-mounted display of FIG. 1A.
Figure 1C:
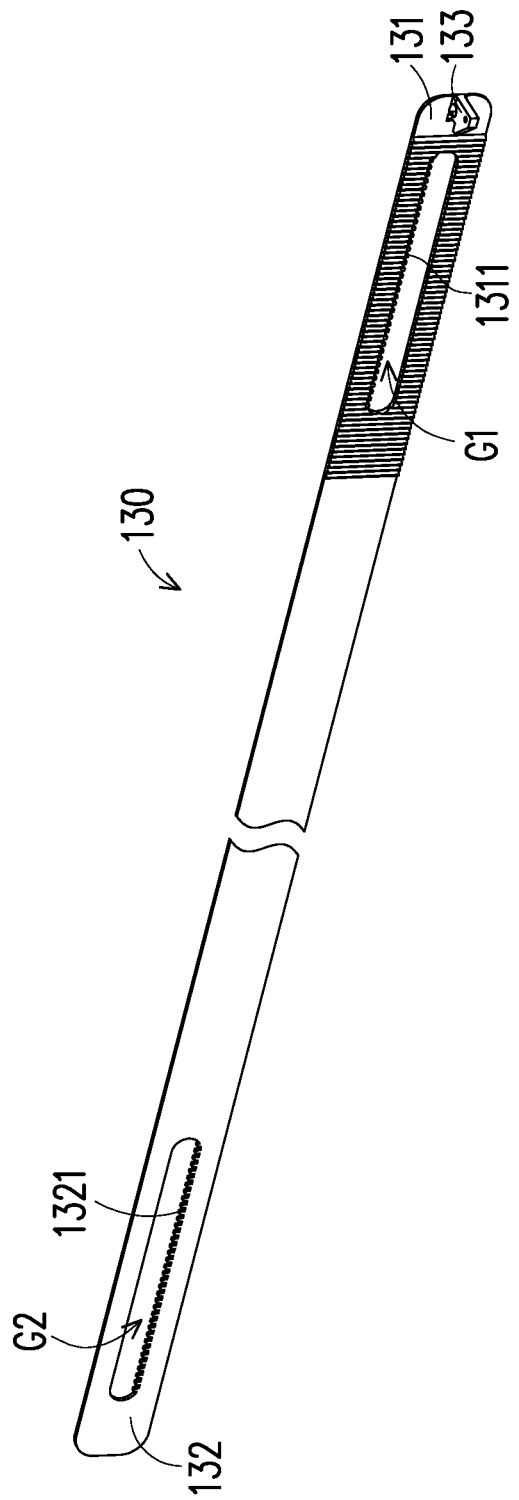
FIG. 1C is a schematic view illustrating an enlarged state of a strap of the head-mounted display of FIG. 1A.
Figure 1D:
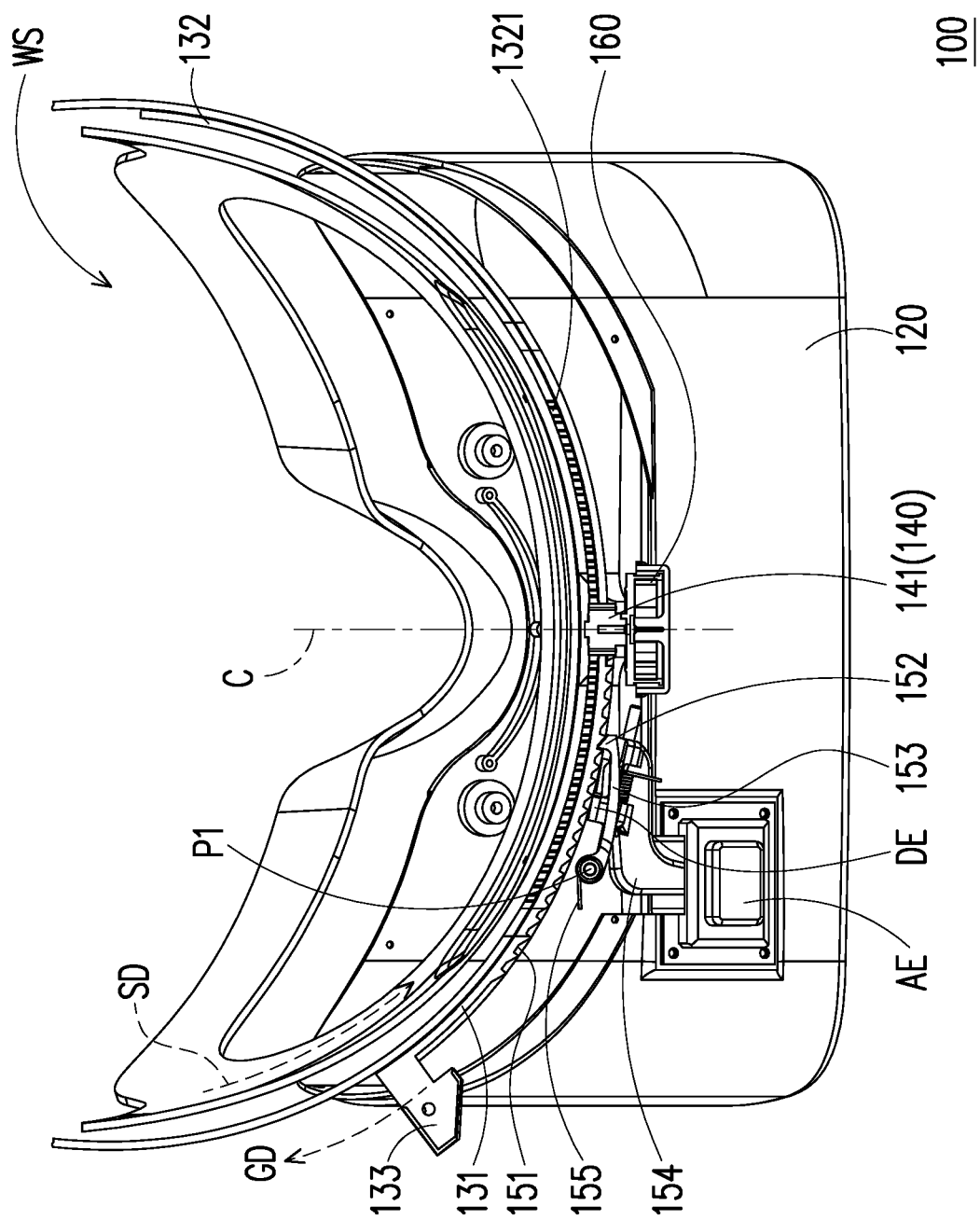
FIG. 1D is a schematic cross-sectional top view of a buckle assembly of the head-mounted display of FIG. 1A.
Figure 1E:
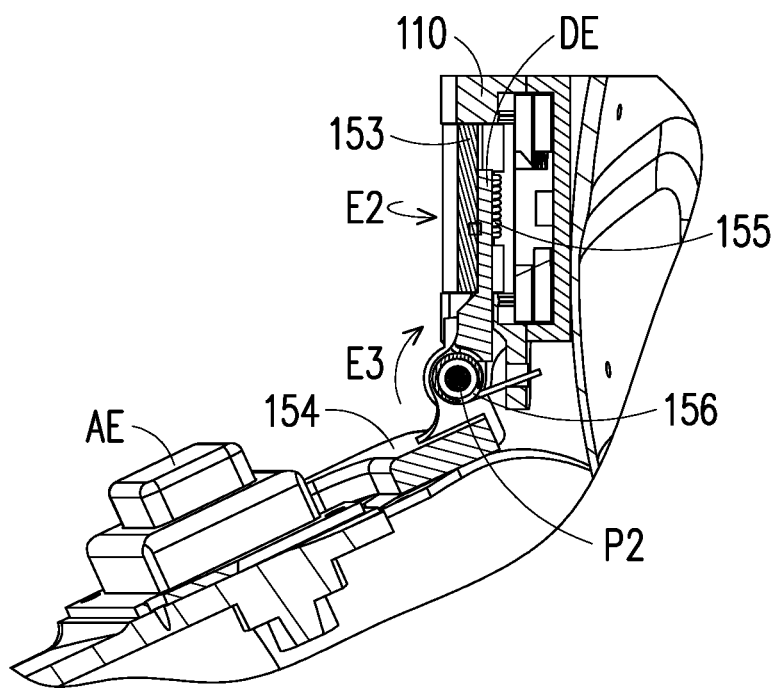
FIG. 1E is a schematic view of a buckled state of the buckle assembly of the head-mounted display of FIG. 1A.
Figure 1F:
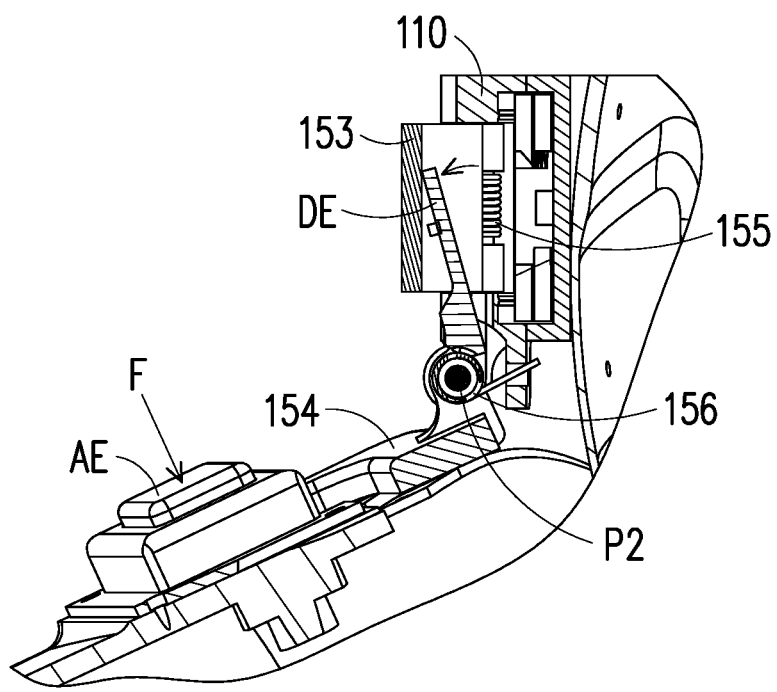
FIG. 1F is a schematic view of a released state of the buckle assembly of the head-mounted display of FIG. 1A.

FIG. 1A is a schematic perspective view of a head-mounted display according to an embodiment of the invention. FIG. 1B is a schematic exploded view of components of the head-mounted display of FIG. 1A. FIG. 1C is a schematic view illustrating an enlarged state of a strap of the head-mounted display of FIG. 1A. FIG. 1D is a schematic cross-sectional top view of a buckle assembly of the head-mounted display of FIG. 1A. FIG. 1E is a schematic view of a buckled state of the buckle assembly of the head-mounted display of FIG. 1A. FIG. 1F is a schematic view of a released state of the buckle assembly of the head-mounted display of FIG. 1A.

Referring to FIGS. 1A to 1C, a head-mounted display 100 of the embodiment includes a wearing part 110, a display body 120, a strap 130, a follower 140, and a buckle assembly 150. The wearing part 110 has an internal space S and an eye mask portion 111. The material of the eye mask portion 111 is plastics, for example. In addition, a cushion (not shown) is disposed on the inner surface of the eye mask portion 111. The cushion of the eye mask portion 111 is made of sponge or other soft materials, for example, so as to be suitable for contacting the head of the user. The display body 120 is disposed on the wearing part 110 and is located at the front side of the eye mask portion 111. The display body 120 is configured to output an image to the eyes of the user.

The strap 130 includes a first end 131, a second end 132, and a handle portion 133. The strap 130 is surrounding to form a wearing space WS. The wearing part 111 is located at the front side of the wearing space WS, and the first end 131 and the second end 132 are overlapped on the front side. The handle portion 133 is located at the first end 131 or the second end 132. In the embodiment, the handle portion 133 is disposed at the first end 131. The first end 131 and the second end 132 overlapped are disposed in the internal space S of the wearing part 110. In addition, the handle portion 133 penetrates through a guiding groove G of the wearing part 110 in a direction away from the wearing space WS, so as for the user to adjust the strap 130 through the handle portion 133. In another embodiment, the handle portion 133 is disposed at the second end 132, for example, and the direction in which the handle portion is disposed is changed accordingly, so as to allow users of different handedness to make adjustment.

The follower 140 is disposed on the wearing part 110 and coupled to the first end 131 and the second end 132, so as to drive the first end 131 and the second end 132 to relatively move away from or toward each other to respectively enlarge or decrease the wearing space WS.

Referring to FIG. 1D to 1F, the buckle assembly 150 is disposed between the wearing part 110 and the first end 131. The buckle assembly 150 is adapted to lock a relative position between the wearing part 110 and the first end 131 (as shown in FIGS. 1D and 1E) in a buckled state, so as to refrain the first end 131 and the second end 132 from relatively moving away from each other, and is adapted to remove the interference between the wearing part 110 and the first end 131 (as shown in FIG. 1F) in a released state.

Referring to FIGS. 1B and 1C, the first end 131 has a first slot G1. A single side of the first slot G1 is formed with a first gear rack 1311. The second end 132 has a second slot G2 overlapped with the first slot G1. An opposite side of the second slot G2 relative to the single side is formed with a second gear rack 1321 parallel to the first gear rack 1311. The follower 140 includes a follower gear 141 pivotally disposed in the internal space S of the wearing part 110, and the follower gear 141 is disposed in the first slot G1 and the second slot G2 and engaged with the first gear rack 1311 and the second gear rack 1321.

Figure 2A:
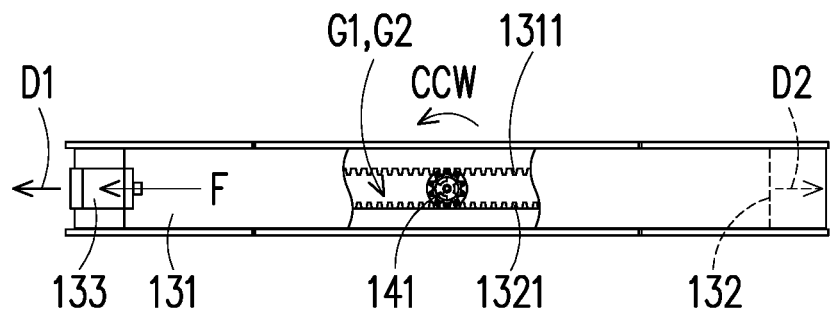
FIG. 2A is a schematic view illustrating decreasing an extent to which a first end and a second end of FIG. 1A are overlapped.
Figure 2B:
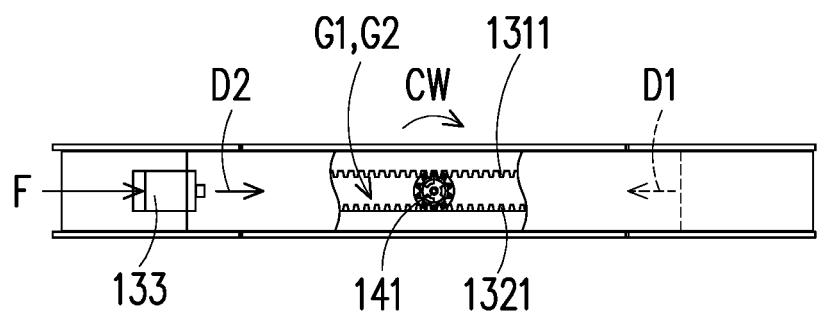
FIG. 2B is a schematic view illustrating increasing the extent to which the first end and the second end of FIG. 1A are overlapped.

FIG. 2A is a schematic view illustrating decreasing an extent to which a first end and a second end of FIG. 1A are overlapped. FIG. 2B is a schematic view illustrating increasing the extent to which the first end and the second end of FIG. 1A are overlapped.

Referring to FIGS. 2A, 2B, and 1A, the follower gear 141 is configured to drive the first end 131 and the second end 132 to move relatively, so as to change the extent to which the first slot G1 and the second slot G2 are overlapped. The handle portion 133 is adapted to receive an external force F to move along the guiding groove G of the wearing part 110. The handle portion 133 drives the first end 131, and drives the follower gear 141 to rotate through the first gear rack 1311. Meanwhile, the follower gear 141 drives the second end 132 to move oppositely to the first end part 131 through the second gear rack 1321. Since the follower gear 141 is engaged with the first gear rack 1311 and the second gear rack 1321, the follower gear 141 is adapted to synchronously drive the first end 131 and the second end 132 to relatively move away from or toward each other. Therefore, the expansion/reduction amounts on two sides of the strap 130 are equal, thereby preventing deviation from occurring.

Referring to FIGS. 1A and 2A, when the handle portion 133 is moved toward a first direction D1, the first end 131 drives the follower gear 141 to rotate in a counter-clockwise direction CCW through the first gear rack 1311, and the follower gear 141 drives the second end 132 to move in a second direction D2 opposite to the first direction D1 through the second gear rack 1321, so as to increase the extent to which the first slot G1 and the second slot G2 are overlapped and thereby decrease the size of the wearing space WS.

Referring to FIGS. 1A and 2B, when the handle portion 133 is moved toward the second direction D2, the first end 131 drives the follower gear 141 to rotate in a clockwise direction CW through the first gear rack 1311, and the follower gear 141 drives the second end 132 to move in the first direction D1 through the second gear rack 1321, so as to decrease the extent to which the first slot G1 and the second slot G2 are overlapped and thereby enlarge the size of the wearing space WS.

Figure 2C:
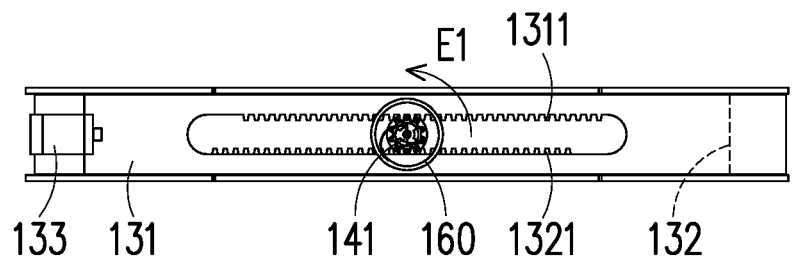
FIG. 2C is a schematic view illustrating a connection between a first restoring spring and a follower gear of the head-mounted display of FIG. 1A.

FIG. 2C is a schematic view illustrating a connection between a first restoring spring and a follower gear of the head-mounted display of FIG. 1A.

Referring to FIGS. 1A, 1B, and 2C, the head-mounted display 100 includes a first restoring sprint 160, such as a coil spring structure. The first restoring spring 160 is disposed on an outer surface of the wearing part 110 toward the display body 120 and is connected to the follower gear 141, so as to provide an elastic force E1 for the follower gear 141 to drive the first end 131 and the second end 132 to relatively move toward each other. Referring to FIGS. 2A and 2B, for example, when the follower gear 141 is driven by the external force F to rotate in the clockwise direction CW, the follower gear 141 may drive and deform the first restoring spring 160 to accumulate the elastic force E1. At this time, the first end 131 and the second end 132 are away from each other. When the external force F is removed, the elastic force E1 is released to drive the follower gear 141 to rotate in the counter-clockwise direction CCW, so as to move the first end 131 and the second end 132 toward each other to be restored to the original positions.

Therefore, the first restoring spring 160 is adapted to automatically increase the extent to which the first slot G1 and the second slot G2 are overlapped to decrease the size of the wearing space WS, thereby reducing the time for adjustment.

Referring to FIGS. 1A to 1E, the buckle assembly 150 includes a unidirectional movement mechanism. In the buckled state, the buckle assembly 150 limits the relative movement of the wearing part 110 and the first end 131 along an enlarging direction SD while permitting the relative movement of the wearing part 110 and the first end 131 to move along a tightening direction GD relative to the enlarging direction SD. In the embodiment, the tightening direction GD is, for example, a direction away from a center C of the wearing part 110, and the enlarging direction SD is, for example, a direction toward the center C of the wearing part 110. Therefore, in the buckled state, the buckle assembly 150 only allows the strap 130 to gradually decrease the size of the wearing space WS. In other embodiments, the enlarging direction SD and the tightening direction GD are opposite to each other, for example. Accordingly, in the buckled state, the buckle assembly 150 only allows the strap 130 to gradually increase the size of the wearing space WS.

More specifically, the buckle assembly 150 includes a ratchet rack 151 located at the first end and a pawl 152 located at the wearing part 110. By fitting the pawl 152 and the ratchet rack 151 with each other, the unidirectional movement of the first end 131 relative to the wearing part 110 is realized. The buckle assembly 150 further includes a movable plate 153 disposed on the wearing part 110, and the pawl 152 is located on the movable plate 153. The movable plate 153 is pivotally connected to the wearing part 110 and is adapted to rotate to move toward or away from the first end 131. For example, the movable plate 142 is pivotally connected to the wearing part 110 through a first rotating axis P1.

The buckle assembly 150 further includes a driving lever 154. The driving lever 154 is pivotally disposed on the wearing part 110 through a fulcrum P. A driving end DE of the driving lever 154 is coupled to the movable plate 153, and a receiving end AE of the driving lever 154 is located on the display body 120. The driving lever 154 is adapted to receive the external force F through the receiving end AE and drive the movable plate 153 through the driving end DE, so as to remove the interference between the pawl 152 and the ratchet rack 151. For example, the driving lever 154 is pivotally connected to the wearing part 110 through a second rotating axis P2 perpendicular to the first rotating axis P1.

The buckle assembly 150 further includes a second restoring spring 155 and a third restoring spring 156. The second restoring spring 155 is a torsion spring and connects the movable plate 153 and the wearing part 110. The second restoring spring 155 is disposed to maintain the interference between the pawl 152 and the ratchet rack 151 in the original state of the second restoring spring 155. The third restoring spring 156 connects the driving lever 154 and the wearing part 110. The third restoring spring 156 is disposed to refrain the driving end DE from driving the movable plate 153 in the original state of the third restoring spring 156.

Referring to FIGS. 1D to 1F and 2A to 2B, when the buckle assembly 150 is to be switched to the released state, the external force F is exerted on the receiving end AE, and the driving end DE drives the movable plate 153 to relatively move away from the first end 131, so that the pawl 152 and the ratchet rack 151 are separated from each other and do not interfere with each other. Therefore, the wearing part 110 and the first end 131 are no longer limited by the buckle assembly 150. At this time, the user may drive the handle portion 133 to move along the tightening direction GD or the enlarging direction SD, so as to move the first end 131 and the second end 132 relatively in the wearing part 110, and the extent to which the first end 131 and the second end 132 are overlapped is adjusted through the synchronous driving of the follower gear 141, so that the size of the wearing space WS can be quickly adjusted.

When the buckle assembly 150 is to be switched to the buckled state, it only requires to remove the external force F exerted on the receiving end AE and respectively push the movable plate 153 and the driving lever 154 to the original positions (as shown in FIG. 1F) with elastic forces E2 and E3 released by the second restoring spring 155 and the third restoring spring 156 to generate interference between the pawl 152 and the ratchet rack 151. In the buckled state, the user may drive the handle portion 133 to move along the tightening direction GD, so as to increase the extent to which the first end 131 and the second end 132 are overlapped, thereby gradually decreasing the wearing space WS.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 3A:
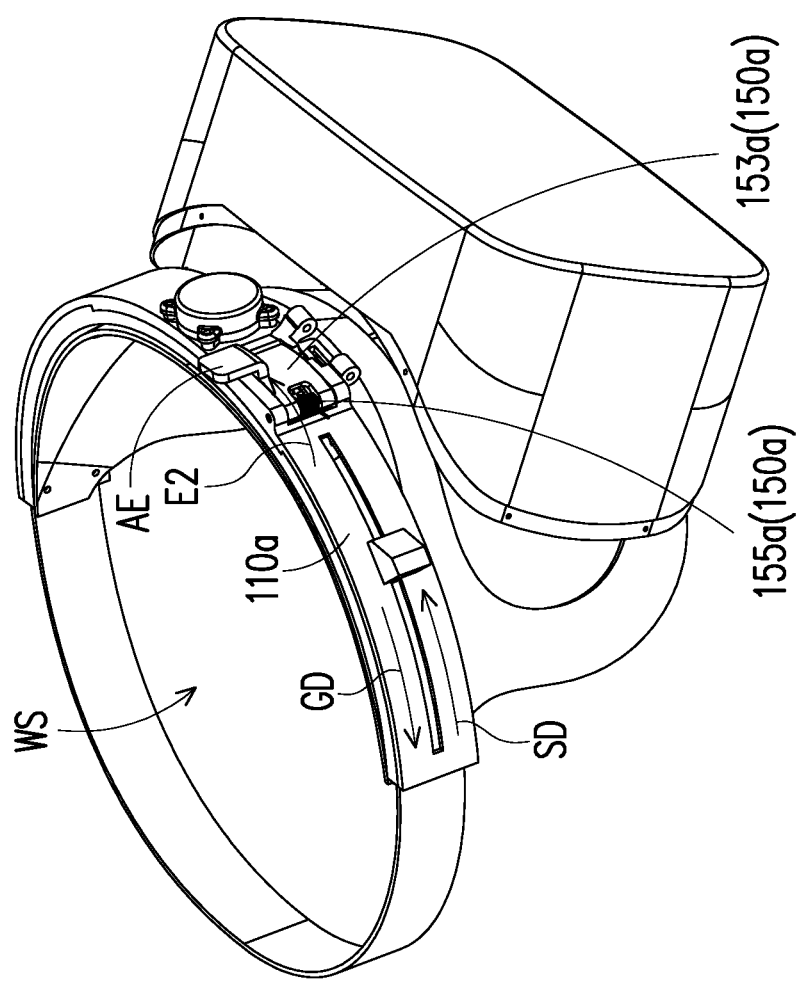
FIG. 3A is a schematic perspective view of a head-mounted display according to another embodiment of the invention.
Figure 3B:
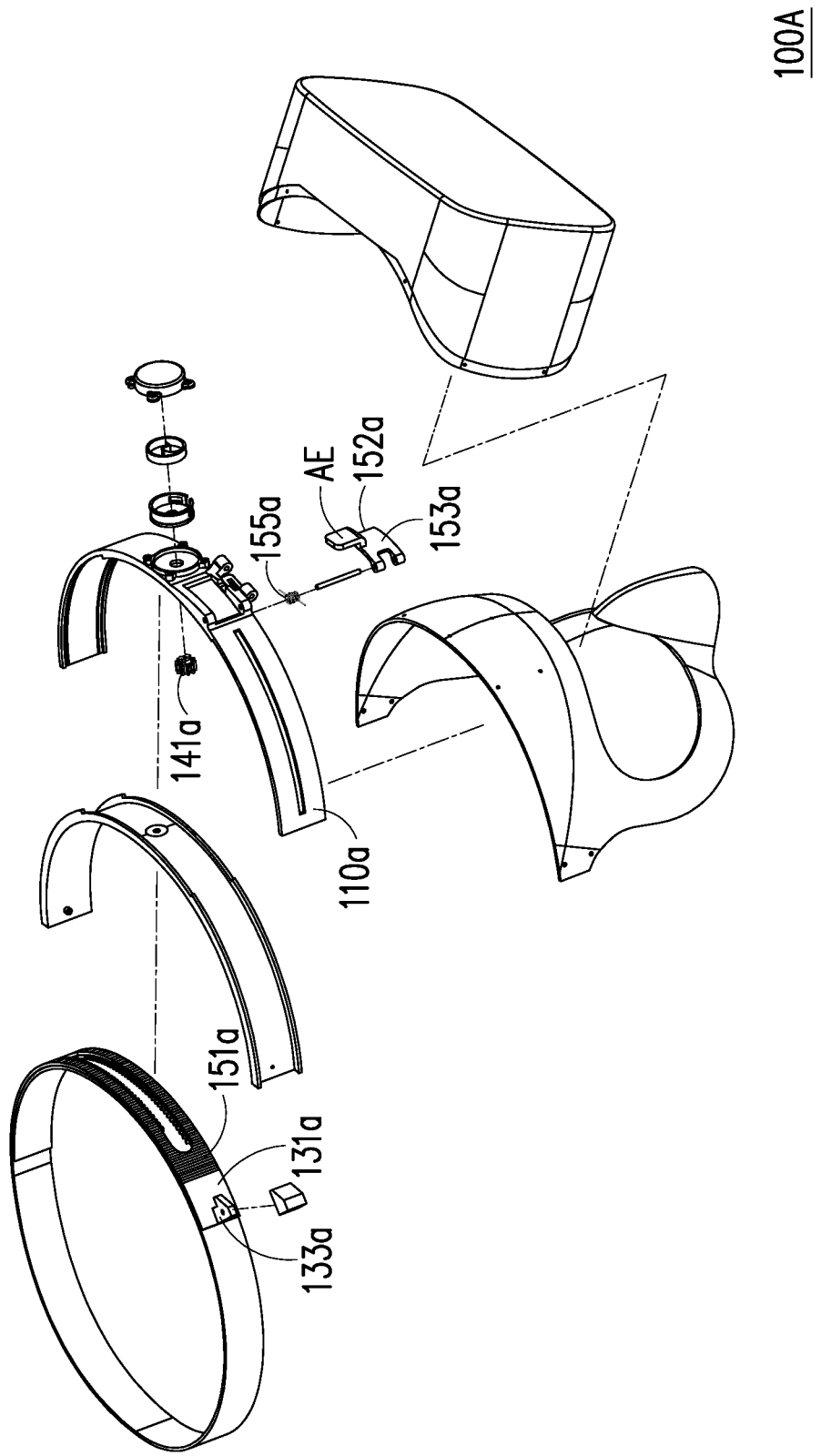
FIG. 3B is a schematic exploded view of components of the head-mounted display of FIG. 3A.

FIG. 3A is a schematic perspective view of a head-mounted display according to another embodiment of the invention. FIG. 3B is a schematic exploded view of components of the head-mounted display of FIG. 3A.

Referring to FIGS. 3A and 3B and FIG. 1A, a head-mounted display 100A of the embodiment differs from the head-mounted display 100 of FIG. 1A in that the head-mounted display 100A does not have the driving lever 154, and a movable plate 153a of the head-mounted display 100A includes the receiving end AE extending upward to exceed a wearing part 110a. The movable plate 153a is adapted to receive the external force F through the receiving end AE and be driven accordingly, so as to remove the interference between a pawl 152a and a ratchet rack 151a (similar to the illustration of FIGS. 1D and 1E). A buckle assembly 150a further includes a second restoring spring 155a connecting the movable plate 153a and the wearing part 110a. The second restoring spring 155a is disposed to maintain the interference between the pawl 152a and the ratchet rack 151a in the original state of the second restoring spring 155a.

In actual use, the user may press the receiving end AE outward to remove the buckled state in which the movable plate 153a and a first end 131a interfere with each other, thereby conveniently and freely enlarging or decreasing the wearing space WS. Meanwhile, the second restoring spring 155a is elastically deformed. When the user no longer presses the receiving end AE, the elastic force E2 may drive the movable plate 153a to move toward the wearing part 110a to restore to the buckled state.

Figure 3C:
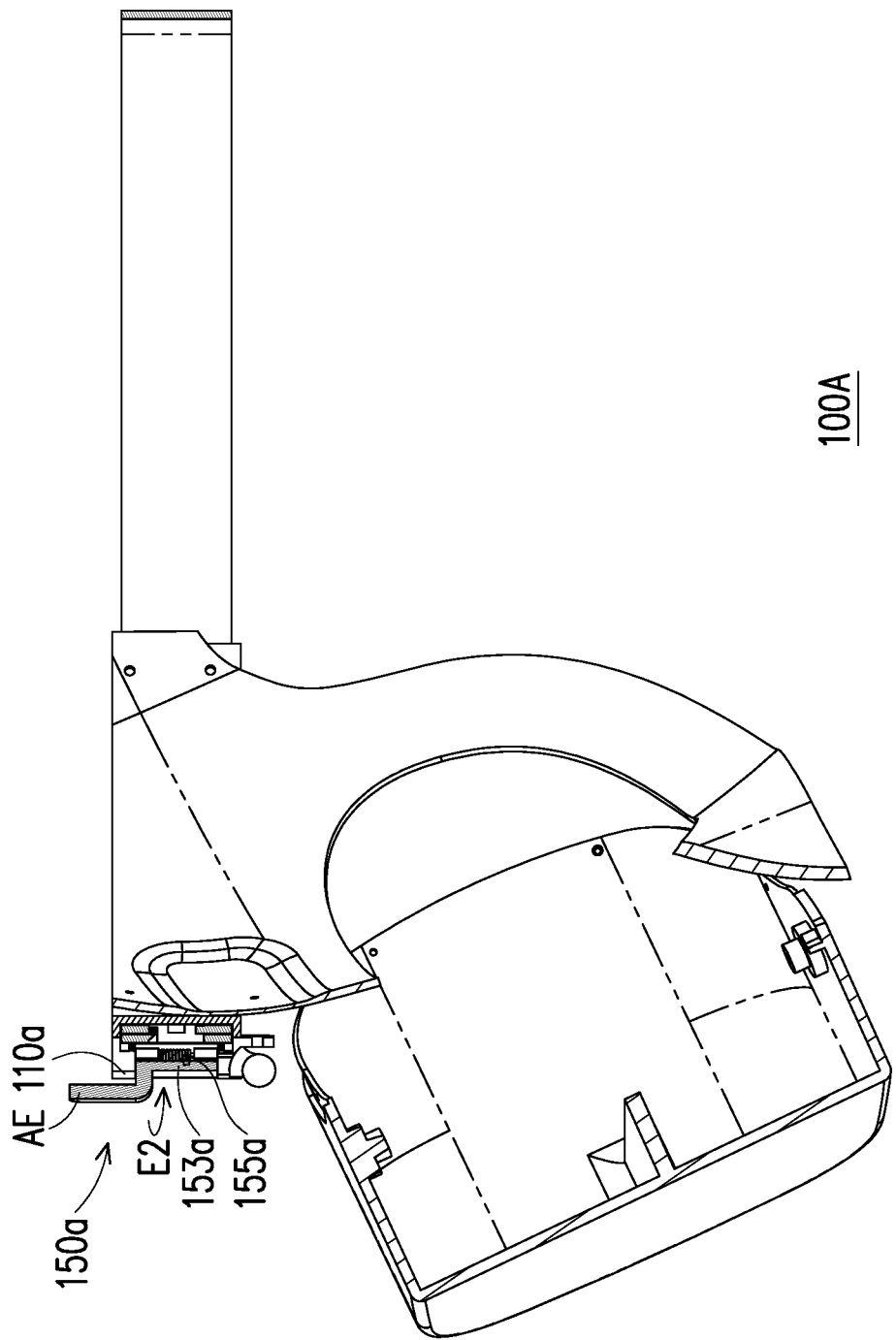
FIG. 3C is a schematic view of a buckled state of the buckle assembly of the head-mounted display of FIG. 3A.

FIG. 3C is a schematic view of a buckled state of the buckle assembly of the head-mounted display of FIG. 3A. FIG. 3D is a schematic view of a released state of the buckle assembly of the head-mounted display of FIG. 3A.

Referring to FIGS. 3A to 3D, when the buckle assembly 150a is to be switched to the released state (as shown in FIG. 3D), the external force F is exerted on the receiving end AE to drive the movable plate 153a to relatively move away from the first end 131a, so that the pawl 152a and the ratchet rack 151a are separated from each other and do not interfere with each other. Therefore, the wearing part 110a and the first end 131a are no longer limited by the buckle assembly 150a. At this time, the user may drive a handle portion 133a to move along the enlarging direction SD or the tightening direction GD, so as to move the first end 131a and a second end 132a relatively in the wearing part 110a, and the extent to which the first end 131a and the second end 132a are overlapped is adjusted through the synchronous driving of a follower gear 141a, so that the size of the wearing space WS can be quickly adjusted.

When the buckle assembly 150a is to be switched to the buckled state, it only requires to remove the external force F exerted on the receiving end AE and push the movable plate 153a to the original position with the elastic force E2 released by the second restoring spring 155 (as shown in FIG. 3C) to generate interference between the pawl 152a and the ratchet rack 151a. In the buckled state, the user may drive the handle portion 133a to move along the tightening direction GD, so as to increase the extent to which the first end 131a and the second end 132a are overlapped, thereby gradually decreasing the wearing space WS.

Figure 4A:
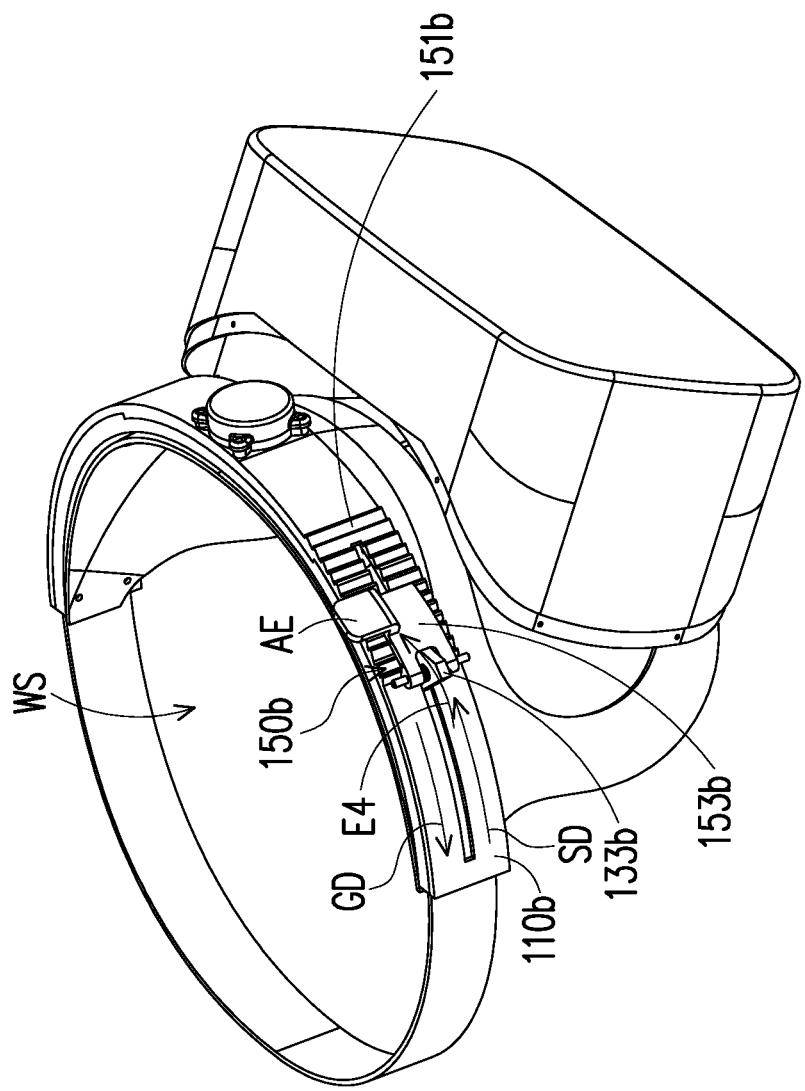
FIG. 4A is a schematic perspective view of a head-mounted display according to another embodiment of the invention.
Figure 4B:
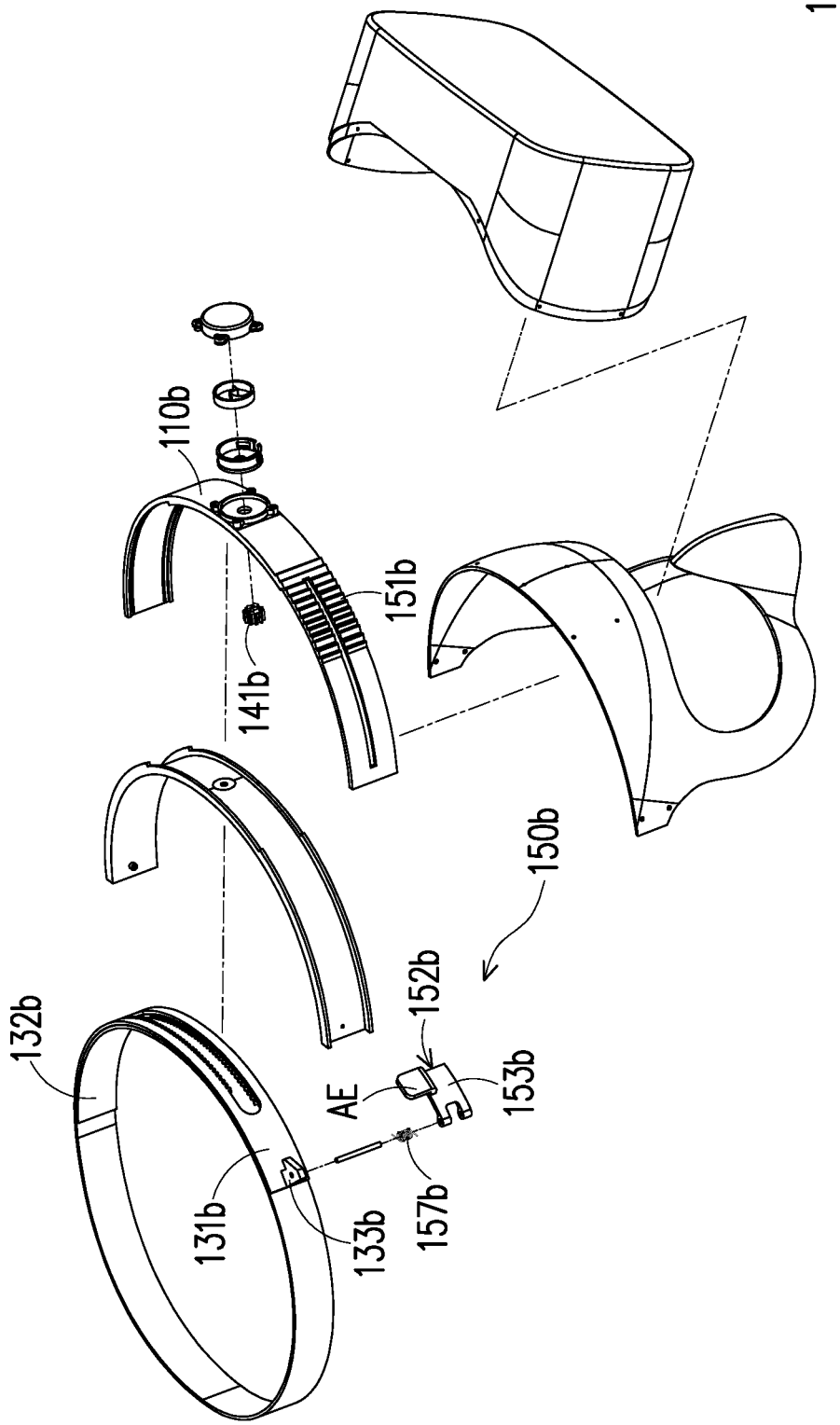
FIG. 4B is a schematic exploded view of components of the head-mounted display of FIG. 4A.

FIG. 4A is a schematic perspective view of a head-mounted display according to another embodiment of the invention. FIG. 4B is a schematic exploded view of components of the head-mounted display of FIG. 4A.

Referring to FIGS. 4A and 4B and FIG. 1A, a head-mounted display 100B of the embodiment differs from the head-mounted display 100 of FIG. 1A in that a buckle assembly 150b includes a ratchet rack 151b located at a wearing part 110b and a pawl 152b located at a first end 131b, and the pawl 152b and the ratchet rack 151b are fit with each other to realize unidirectional movement. A handle portion 133b is located at the first end 131b. The buckle assembly 150b includes a movable plate 153b disposed at the handle portion 133b, and the pawl 152b is located on the movable plate 153b.

The movable plate 153b includes the receiving end AE extending upward to exceed the wearing part 110a. The movable plate 153b is adapted to receive the external force F through the receiving end AE and be driven accordingly, so as to remove the interference between the pawl 152b and the ratchet rack 151b (similar to the illustration of FIGS. 1D and 1E). The buckle assembly 150b further includes a fourth restoring spring 157b connecting the movable plate 153b and the handle portion 133b. The fourth restoring spring 157b is disposed to maintain the interference between the pawl 152b and the ratchet rack 151b in the original state of the fourth restoring spring 157b.

In actual use, the user may press the receiving end AE outward to remove the buckled state in which the movable plate 153b and the wearing part 110b interfere with each other, thereby conveniently and freely enlarging or decreasing the wearing space WS. Meanwhile, the fourth restoring spring 157b is elastically deformed. When the user no longer presses the receiving end AE, an elastic force E4 may drive the movable plate 153b to move toward the wearing part 110b to restore to the buckled state.

Figure 4C:
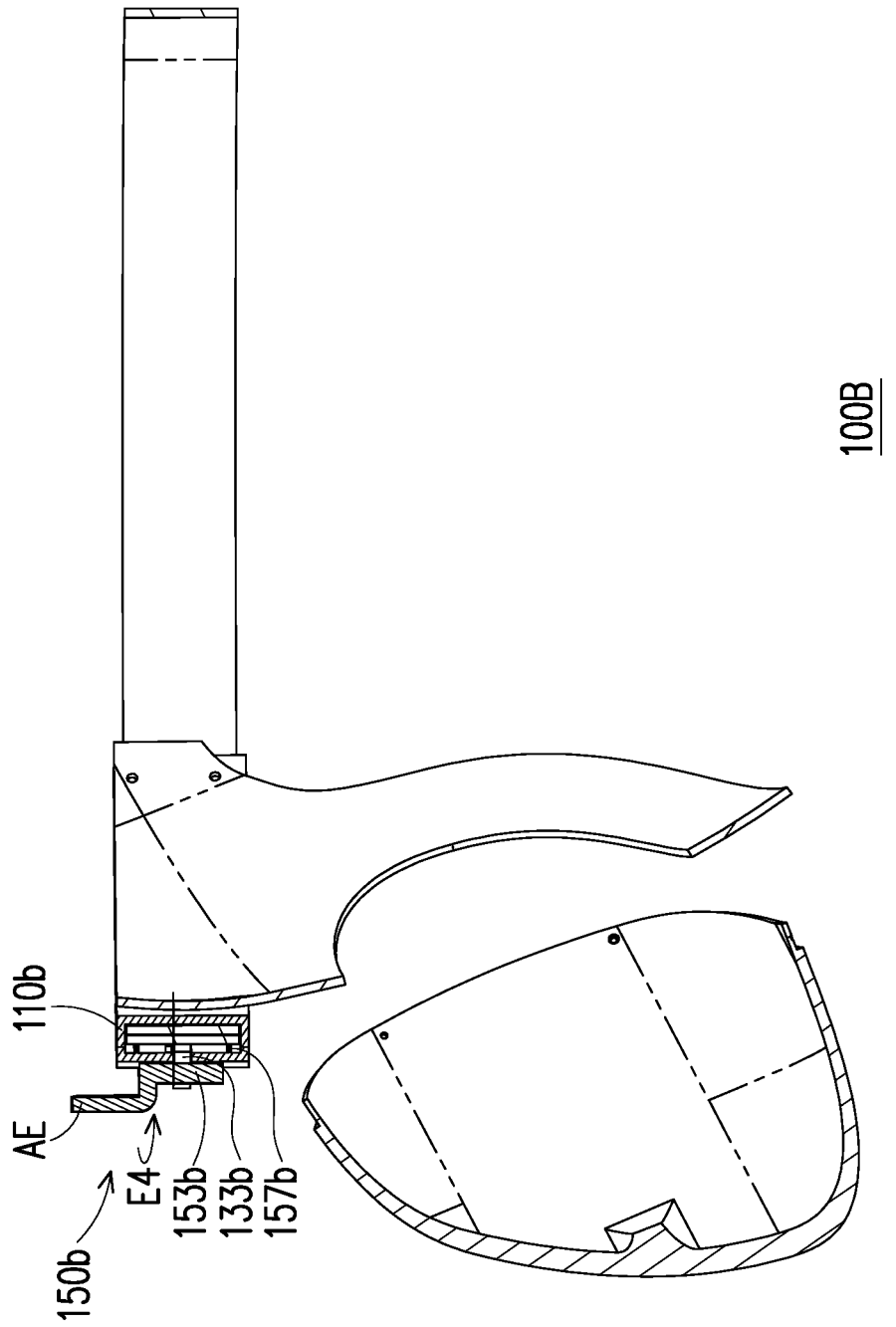
FIG. 4C is a schematic view of a buckled state of the buckle assembly of the head-mounted display of FIG. 4A.
Figure 4D:
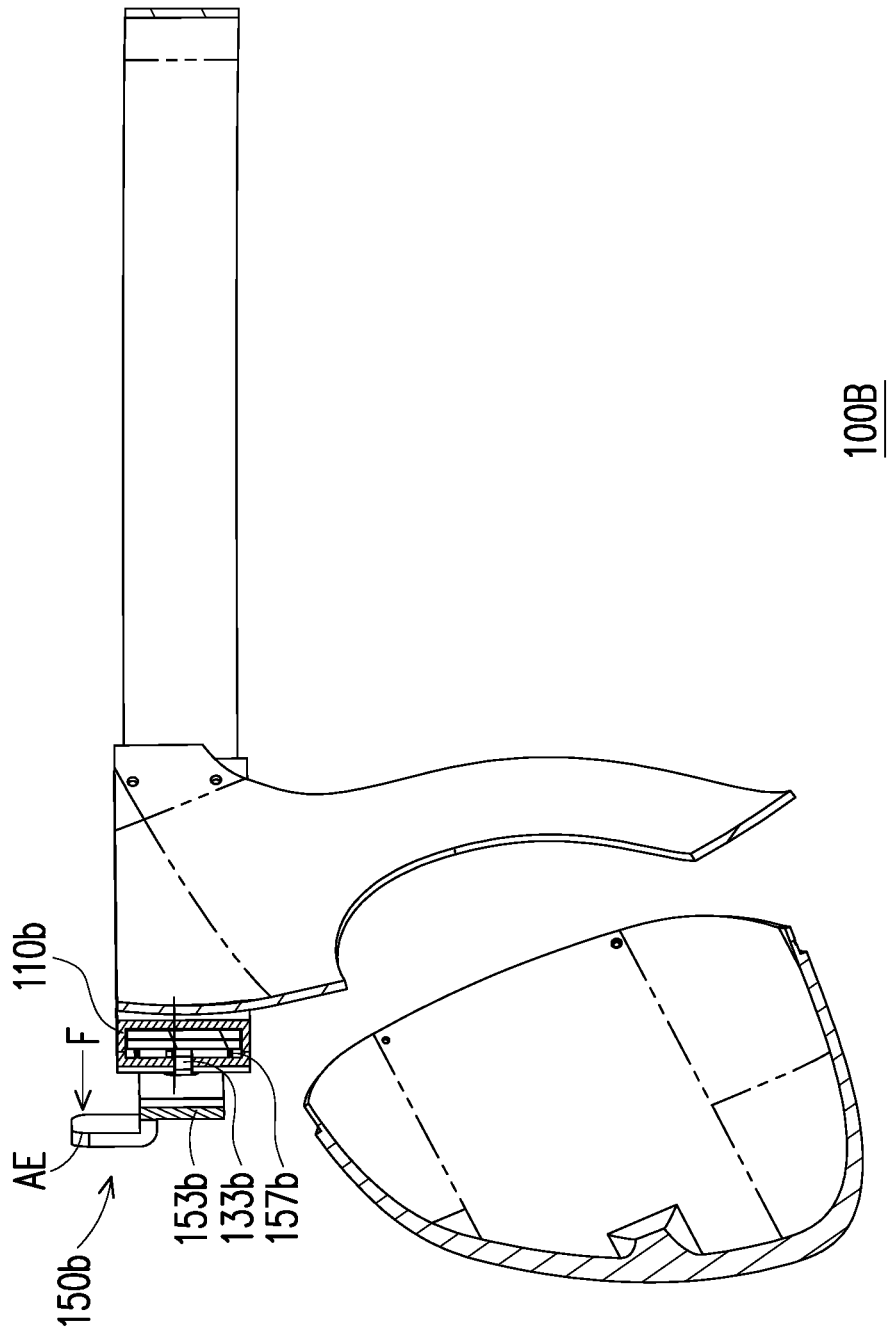
FIG. 4D is a schematic view of a released state of the buckle assembly of the head-mounted display of FIG. 4A.

FIG. 4C is a schematic view of a buckled state of the buckle assembly of the head-mounted display of FIG. 4A. FIG. 4D is a schematic view of a released state of the buckle assembly of the head-mounted display of FIG. 4A.

Referring to FIGS. 4A to 4D, when the buckle assembly 150b is to be switched to the released state (as shown in FIG. 4D), the external force F is exerted on the receiving end AE to drive the movable plate 153b to relatively move away from the first end 131b, so that the pawl 152b and the ratchet rack 151b are separated from each other and do not interfere with each other. Therefore, the wearing part 110b and the first end 131b are no longer limited by the buckle assembly 150b. At this time, the user may drive the handle portion 133b to move along the enlarging direction SD or the tightening direction GD, so as to move the first end 131b and a second end 132b relatively in the wearing part 110b, and the extent to which the first end 131b and the second end 132b are overlapped is adjusted through the synchronous driving of a follower gear 141b, so that the size of the wearing space WS can be quickly adjusted.

When the buckle assembly 150b is to be switched to the buckled state, it only requires to remove the external force F exerted on the receiving end AE and push the movable plate 153b to the original position with the elastic force E4 released by the fourth restoring spring 157b (as shown in FIG. 4C) to generate interference between the pawl 152b and the ratchet rack 151b. In the buckled state, the user may drive the handle portion 133b to move along the tightening direction GD, so as to increase the extent to which the first end 131b and the second end 132b are overlapped, thereby gradually decreasing the wearing space WS.

Figure 5A:
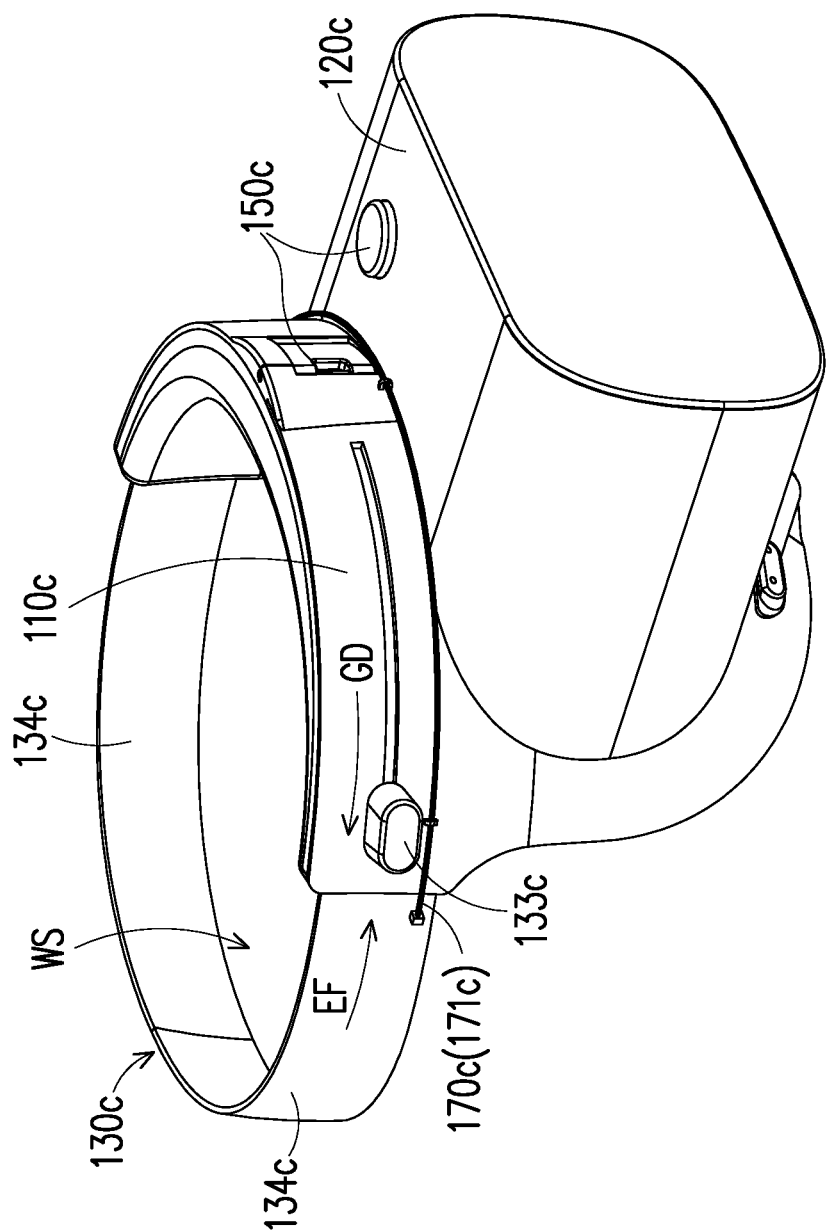
FIG. 5A is a schematic perspective view of a head-mounted display according to yet another embodiment of the invention.
Figure 5B:
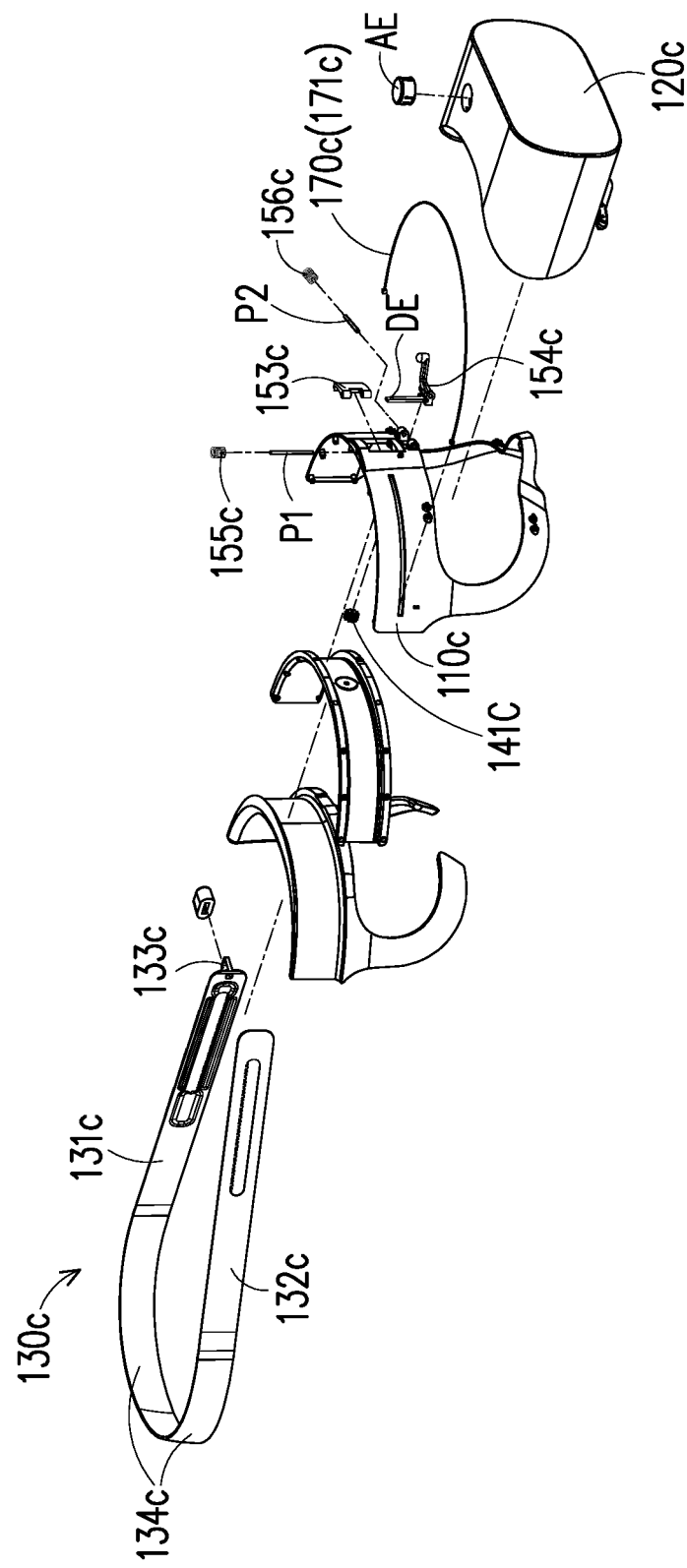
FIG. 5B is a schematic exploded view of components of the head-mounted display of FIG. 5A.
Figure 5C:
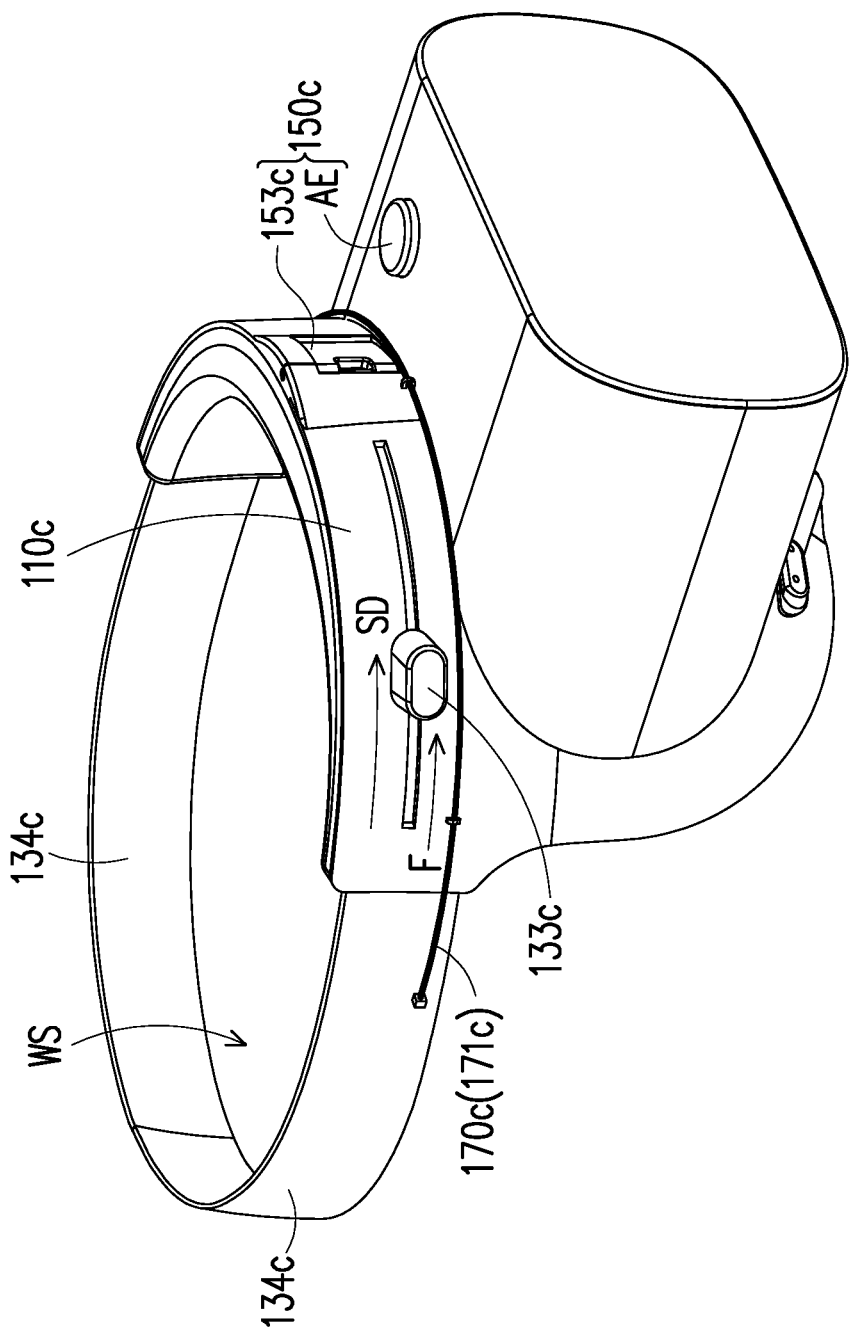
FIG. 5C is a schematic perspective view of an extended wearing space of the head-mounted display of FIG. 5A.
Figure 5D:
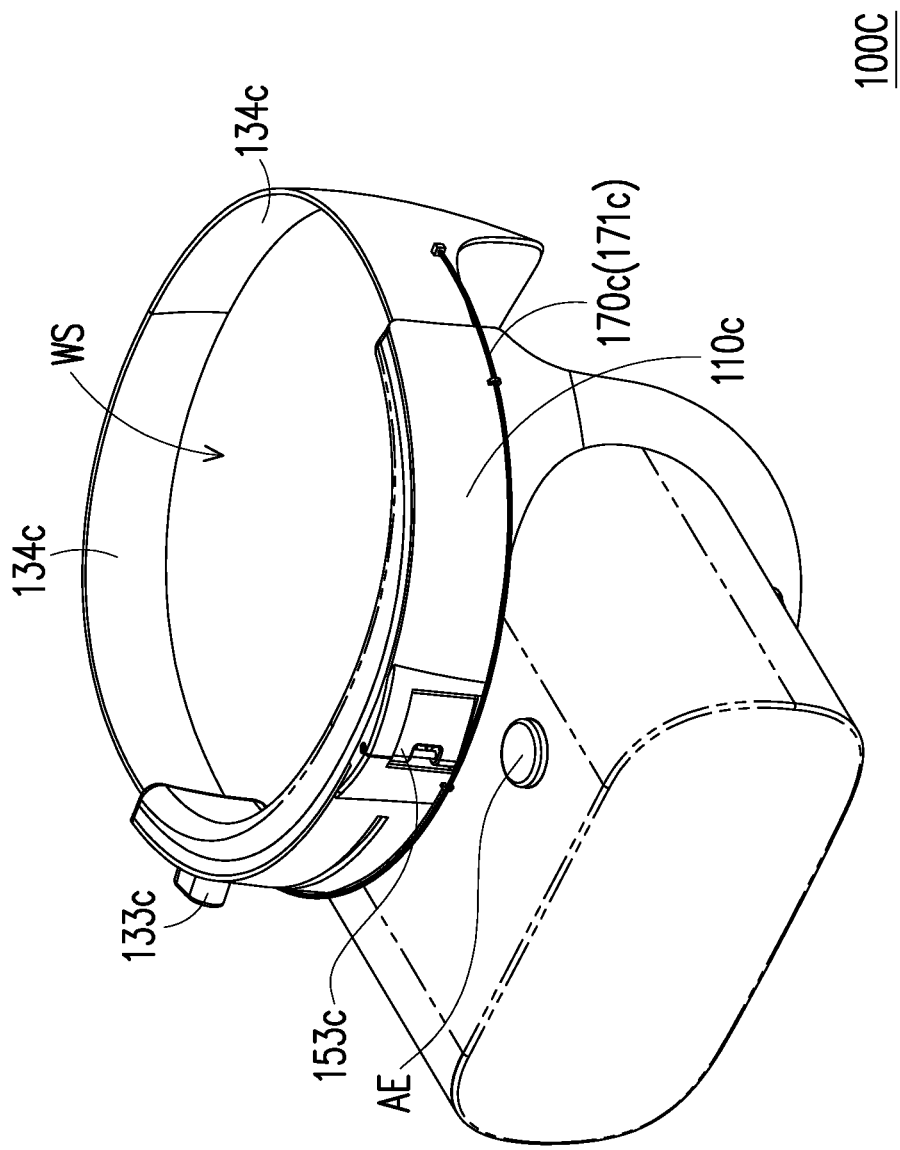
FIG. 5D is a schematic perspective view of the head-mounted display of FIG. 5C in another orientation.

FIG. 5A is a schematic perspective view of a head-mounted display according to yet another embodiment of the invention. FIG. 5B is a schematic exploded view of components of the head-mounted display of FIG. 5A. FIG. 5C is a schematic perspective view of an extended wearing space of the head-mounted display of FIG. 5A. FIG. 5D is a schematic perspective view of the head-mounted display of FIG. 5C in another orientation.

Referring to FIGS. 5A and 5B and FIG. 1A, a head-mounted display 100C of the embodiment differs from the head-mounted display 100 of FIG. 1A in that the head-mounted display 100C includes an elastic member 170c which replaces the first restoring spring 160. The elastic member 170c is disposed between a strap 130c and a wearing part 110c and configured to provide an elastic force EF driving a first end 131c and a second end 132c to relatively move toward each other. The elastic member 70c includes an elastic string 171c disposed on an outer wall surface of the wearing part 110c toward a display body 120c. In addition, two ends of the elastic string are respectively connected to two connection portions 134c of a strap 130c at two sides of the wearing part 110c.

Referring to FIGS. 5A and 5C, specifically, the connection portion 134c is a portion of the strap 130c extending to exceed the wearing part 110c. When the user exerts a force on a handle portion 133c to drive the first end 131c to move toward the enlarging direction SD relative to the wearing part 110c, the extent to which the first end 131c and the second end 132c are overlapped is decreased (similar to the illustration of FIG. 2B), so the wearing space WS is increased. At this time, the two connection portions 134c of the strap 130c are relatively away from the wearing part 110c and simultaneously pull the two ends of the elastic string 171c, so the elastic string 170c is elastically deformed and the elastic force EF accumulates. When the user stops exerting the force on the handle portion 133c, the elastic string 171c may drive the two connection portions 134c with the elastic force EF to relatively move toward the wearing part 110c, so that the first end 131c is moved toward the tightening direction GD relatively to the wearing part 110c, thereby automatically increasing the extent to which the first end 131c and the second end 132c are overlapped (similar to the illustration of FIG. 2A) and automatically decreasing the wearing space WS to the original size.

The buckle assembly 150c further includes a driving lever 154c. The driving lever 154c is pivotally disposed to the wearing part 110c. The driving end DE of the driving lever 154c is coupled to the movable plate 153c, and the receiving end AE of the driving lever 154c is located on the display body 120c. The driving lever 154c is adapted to receive the external force F through the receiving end AE and drive the movable plate 153c through the driving end DE. For example, the driving lever 154c is pivotally connected to the wearing part 110c through the second rotating axis P2 perpendicular to the first rotating axis P1. The buckle assembly 150c further includes a second restoring spring 155c and a third restoring spring 156c.

Referring to FIGS. 5C and 5D, in the head-mounted display 100C of the embodiment, the handle portion 133c of the strap 130c and the driving lever 154c of the buckle assembly 150c are disposed on opposite two sides of the display body 120c, so that the user may use his/her left hand to support the display body 120c and press the driving end DE of the driving lever 154c and use his/her right hand to drive the handle portion 133c to adjust the size of the strap 130c.

Figure 6A:
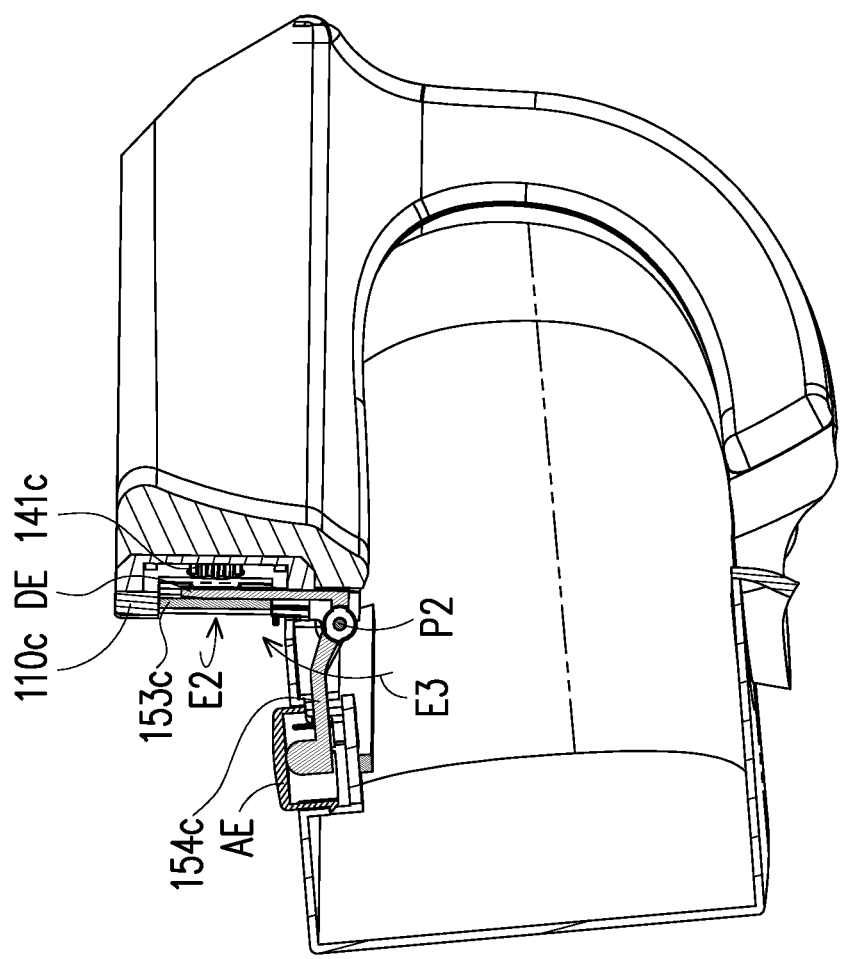
FIG. 6A is a schematic view of a buckled state of the buckle assembly of the head-mounted display of FIG. 5A.
Figure 6B:
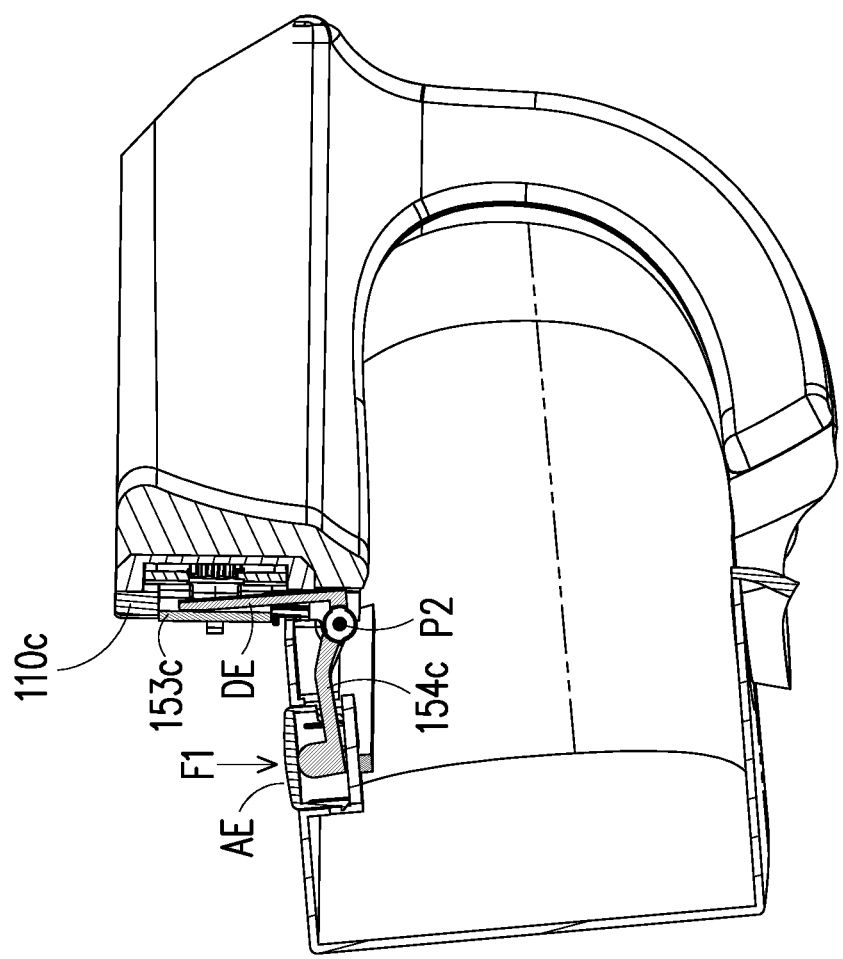
FIG. 6B is a schematic view of a released state of the buckle assembly of the head-mounted display of FIG. 5A.

FIG. 6A is a schematic view of a buckled state of the buckle assembly of the head-mounted display of FIG. 5A. FIG. 6B is a schematic view of a released state of the buckle assembly of the head-mounted display of FIG. 5A.

Referring to FIGS. 5A and 5B and FIGS. 6A to 6B, when the buckle assembly 150c is to be switched to the released state, an external force F1 is exerted on the receiving end AE, and the driving end DE drives the movable plate 153c to relatively move away from the first end 131c (as shown in FIG. 6B), so there is no mutual interference. Therefore, the wearing part 110c and the first end 131c are no longer limited by the buckle assembly 150c. At this time, the user may drive the handle portion 133c to move along the tightening direction GD or the enlarging direction SD, so as to move the first end 131c and the second end 132c relatively in the wearing part 110c, and the extent to which the first end 131c and the second end 132c are overlapped is adjusted through the synchronous driving of a follower gear 141c, so that the size of the wearing space WS can be quickly adjusted.

When the buckle assembly 150c is to be switched to the buckled state, it only requires to remove the external force F1 exerted on the receiving end AE and respectively push the movable plate 153c and the driving lever 154c to the original positions (as shown in FIG. 6A) with the elastic forces E2 and E3 released by the second restoring spring 155c and the third restoring spring 156c. In the buckled state, the user may drive the handle portion 133c to move along the tightening direction GD, so as to increase the extent to which the first end 131c and the second end 132c are overlapped, thereby gradually decreasing the wearing space WS.

In view of the foregoing, in the head-mounted display of the application, the first end and the second end of the strap are overlapped at the front side, and the handle portion and the follower are adopted to drive the first end and the second end to relatively move away from or toward each other, so as to enlarge or decrease the size of the wearing space, thereby allowing the head-mounted display to be adaptable to different head shapes and sizes. Since the first end, the second end, and the handle portion of the application are all disposed at the front side of the wearing space (corresponding to the user's forehead), when wearing the head-mounted display and lying on the bed or sitting on a chair, the user may still control the handle portion with a single hand to adjust the size of the wearing space without being interfered.

Besides, the buckle assembly of the application is switchable between the buckled state and the released state. In the buckled state, the buckle assembly is configured to lock the relative position between the wearing part and the first end, so that the first end and the second end are unable to relatively move away from each other, thereby limiting the user to only gradually decrease the wearing space. In the released state, there is no interference between the wearing part and the first end. Therefore, the first end and the second end may relatively move away from or toward each other, so that the user may freely adjust the size of the wearing space, thereby making the adjustment more efficient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A head-mounted display, comprising:
a wearing part;
a display body, disposed on the wearing part;
a strap, comprising a first end, a second end, and a handle portion, wherein the strap is surrounding to form a wearing space, the wearing part is located at a front side of the wearing space, the first end and the second end are overlapped at the front side, and the handle portion is located at the first end or the second end;
a follower, disposed on the wearing part and coupled to the first end and the second end, so as to drive the first end and the second end to relatively move away from or toward each other to respectively enlarge or decrease the wearing space; and
a buckle assembly, disposed between the wearing part and the first end, wherein the buckle assembly is adapted to lock a relative position between the wearing part and the first end in a buckled state, so as to refrain the first end and the second end from relatively moving away from each other, and the buckle assembly is adapted to remove interference between the wearing part and the first end in a released state,
wherein, the buckle assembly comprises a unidirectional movement mechanism, and in the buckled state, the buckle assembly limits relative movement of the wearing part and the first end along an enlarging direction while permitting relative movement of the wearing part and the first end along a tightening direction relative to the enlarging direction,
wherein, the buckle assembly further comprises a movable plate disposed on the wearing part, and a pawl is located on the movable plate, and the buckle assembly further comprises a driving lever pivotally disposed on the wearing part through a fulcrum, a driving end of the driving lever is coupled to the movable plate, a receiving end of the driving lever is located on the display body, and the driving lever is adapted to receive an external force through the receiving end, such that the driving end drives the movable plate to remove interference between the pawl and a ratchet rack.

2. The head-mounted display as claimed in claim 1, wherein the first end has a first slot, a single side of the first slot is formed with a first gear rack, the second end has a second slot overlapped with the first slot, an opposite side of the second slot relative to the single side is formed with a second gear rack parallel to the first gear rack, the follower comprises a follower gear pivotally disposed to the wearing part, and the follower gear is disposed in the first slot and the second slot and engaged with the first gear rack and the second gear rack.

3. The head-mounted display as claimed in claim 2, further comprising a first restoring spring disposed on the wearing part, connected to the follower gear, and configured to provide an elastic force for the follower gear to drive the first end and the second end to relatively move toward each other.

4. The head-mounted display as claimed in claim 1, wherein the buckle assembly comprises a ratchet rack located at the first end and a pawl located at the wearing part, and the pawl and the ratchet rack are fit with each other to realize unidirectional movement.

5. The head-mounted display as claimed in claim 1, wherein the movable plate comprises a receiving end, and the movable plate is adapted to receive an external force through the receiving end and be driven, so as to remove interference between the pawl and the ratchet rack.

6. The head-mounted display as claimed in claim 5, wherein the buckle assembly further comprises a second restoring spring connecting the movable plate and the wearing part, and the second restoring spring is disposed to maintain the interference between the pawl and the ratchet rack in an original state of the second restoring spring.

7. The head-mounted display as claimed in claim 1, wherein the buckle assembly further comprises a second restoring spring connecting the movable plate and the wearing part, and the second restoring spring is disposed to maintain the interference between the pawl and the ratchet rack in an original state of the second restoring spring.

8. The head-mounted display as claimed in claim 1, wherein the buckle assembly further comprises a third restoring spring connecting the driving lever and the wearing part, and the third restoring spring is disposed to refrain the driving end from driving the movable plate in an original state of the third restoring spring.

9. The head-mounted display as claimed in claim 1, wherein the buckle assembly comprises a ratchet rack located at the wearing part and a pawl located at the first end, and the pawl and the ratchet rack are fit with each other to realize unidirectional movement.

10. The head-mounted display as claimed in claim 9, wherein the handle portion is located at the first end and the movable plate is disposed on the handle portion.

11. The head-mounted display as claimed in claim 10, wherein the movable plate comprises a receiving end, and the movable plate is adapted to receive an external force through the receiving end and be driven, so as to remove interference between the pawl and the ratchet rack.

12. The head-mounted display as claimed in claim 10, wherein the buckle assembly further comprises a fourth restoring spring connecting the movable plate and the handle portion, and the fourth restoring spring is disposed to maintain the interference between the pawl and the ratchet rack in an original state of the fourth restoring spring.

13. The head-mounted display as claimed in claim 1, further comprising an elastic member disposed between the strap and the wearing part and configured to provide an elastic force driving the first end and the second end to relatively move toward each other.

14. The head-mounted display as claimed in claim 13, wherein the elastic member comprises an elastic string disposed on the wearing part, and two ends of the elastic string are respectively connected to two connection portions of the strap located at two sides of the wearing part.

* * * * *